US012808160B2

(12) United States Patent
Sekiguchi et al.

(10) Patent No.: US 12,808,160 B2
(45) Date of Patent: Nov. 24, 2026

(54) CONSTRUCTION MACHINE

(71) Applicant: JDC Corporation, Tokyo (JP)

(72) Inventors: Masakazu Sekiguchi, Tokyo (JP); Hidetoshi Morimoto, Tokyo (JP); Hiroshi Obata, Tokyo (JP); Tsukasa Baba, Tokyo (JP)

(73) Assignee: JDC Corporation, Minato-ku (JP)

( * ) Notice: Subject to any disclaimer, the term of this patent is extended or adjusted under 35 U.S.C. 154(b) by 242 days.

(21) Appl. No.: 18/245,798

(22) PCT Filed: Mar. 25, 2021

(86) PCT No.: PCT/JP2021/012508

§ 371 (c)(1), (2) Date: Mar. 17, 2023

(87) PCT Pub. No.: WO2022/074863

PCT Pub. Date: Apr. 14, 2022

(65) Prior Publication Data

US 2024/0026657 A1 Jan. 25, 2024

Related U.S. Application Data

(60) Provisional application No. 63/089,041, filed on Oct. 8, 2020.

(51) Int. Cl.

| | |
|---|---|
| ***E02F 9/26*** | (2006.01) |
| ***B64U 80/86*** | (2023.01) |
| *B64U 101/32* | (2023.01) |

(52) U.S. Cl.

CPC .............. *E02F 9/262* (2013.01); *B64U 80/86* (2023.01); *B64U 2101/32* (2023.01)

(58) Field of Classification Search

CPC .......... E02F 9/262; E02F 9/261; B64U 80/86; B64U 2101/32; B64U 2101/30; B64U 10/13

See application file for complete search history.

(56) References Cited

U.S. PATENT DOCUMENTS

| | | | | |
|---|---|---|---|---|
| 11,679,961 B2 * | 6/2023 | Palberg | E02F 9/264 701/3 |
| 2013/0001492 A1 * | 1/2013 | Suzuki | E02F 9/226 254/93 VA |
| 2014/0039767 A1 * | 2/2014 | Jensen | B60K 23/0808 701/50 |
| 2015/0032338 A1 * | 1/2015 | Tomita | E02F 3/965 701/50 |

(Continued)

FOREIGN PATENT DOCUMENTS

| | | |
|---|---|---|
| JP | S52-016801 A | 2/1977 |
| JP | 2000-265494 A | 9/2000 |

(Continued)

*Primary Examiner* — Roy Rhee

(74) *Attorney, Agent, or Firm* — Young Basile Hanlon & MacFarlane, P.C.

(57) ABSTRACT

A construction machine that does not assume manned field operation is described. A construction machine includes a main body that travels by a traveling device, a working device connected to the main body, a take-off and landing portion provided on the main body, and a plurality of unmanned flying objects that take off and land at the take-off and landing portion.

5 Claims, 8 Drawing Sheets

(56) References Cited

U.S. PATENT DOCUMENTS

| | | | | |
|---|---|---|---|---|
| 2016/0378109 | A1* | 12/2016 | Raffa | H04N 23/695 701/2 |
| 2018/0158337 | A1* | 6/2018 | Koravadi | G05D 1/0253 |
| 2018/0282970 | A1 | 10/2018 | Koga et al. | |
| 2020/0218286 | A1* | 7/2020 | Tamasato | G05D 1/0684 |
| 2020/0299935 | A1* | 9/2020 | Izumikawa | E02F 9/2025 |
| 2021/0208606 | A1 | 7/2021 | Nakazawa et al. | |

FOREIGN PATENT DOCUMENTS

| | | | |
|---|---|---|---|
| JP | 2016-089559 | A | 5/2016 |
| WO | 2017/099070 | A1 | 6/2017 |
| WO | 2019/026169 | A1 | 2/2019 |
| WO | 2020/105183 | A1 | 5/2020 |

* cited by examiner

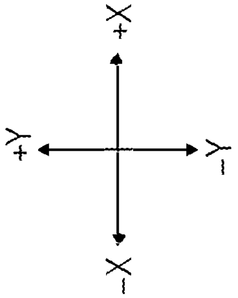
FIG. 3B
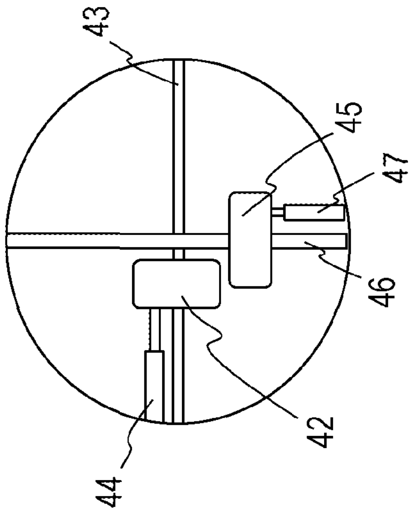
FIG. 3A
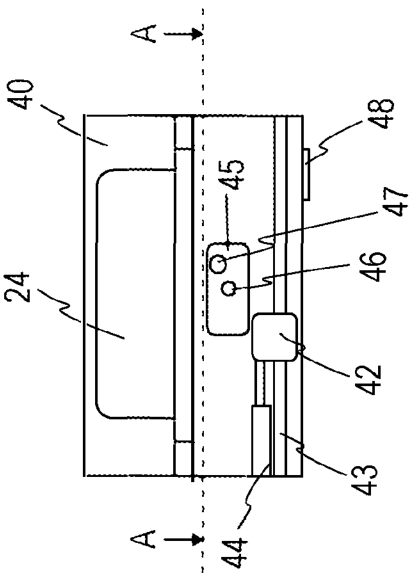

CONSTRUCTION MACHINE

TECHNICAL FIELD

The present invention relates to a construction machine such as a hydraulic excavator that performs excavation and loading work, and particularly relates to a construction machine for automatic operation.

BACKGROUND

Conventionally, studies on automatic operation of a construction machine such as a hydraulic excavator has been promoted, and switching between manual operation and automatic operation is disclosed in JP Patent Publication No. 2016-89559 A.

SUMMARY

However, to switch between manual operation and automatic operation, manned work has been assumed.

Therefore, an object of the present invention is to provide a construction machine that does not assume manned field operation.

A construction machine according to a first implementation of the invention includes: a main body device that travels by a traveling device; a working device connected to the main body device; a take-off and landing portion provided on the main body device; and a plurality of unmanned flying objects that take off and land at the take-off and landing portion.

According to the first implementation, it is possible to provide a construction machine that does not assume manned field operation because a plurality of unmanned flying objects assists the construction machine.

BRIEF DESCRIPTION OF THE DRAWINGS

FIG. 3A is a cross-sectional view of a main body device of the present first embodiment, and FIG. 3B is a view taken along a line A-A of FIG. 3A.

DETAILED DESCRIPTION

Hereinafter, a construction machine system 1 of a first embodiment of the present invention will be described in detail with reference to the accompanying drawings. Note that the present invention is not limited by the embodiment described below. In the present embodiment, the description will be continued by using a hydraulic excavator 10 as an example of a construction machine.

First Embodiment

Figure 1:
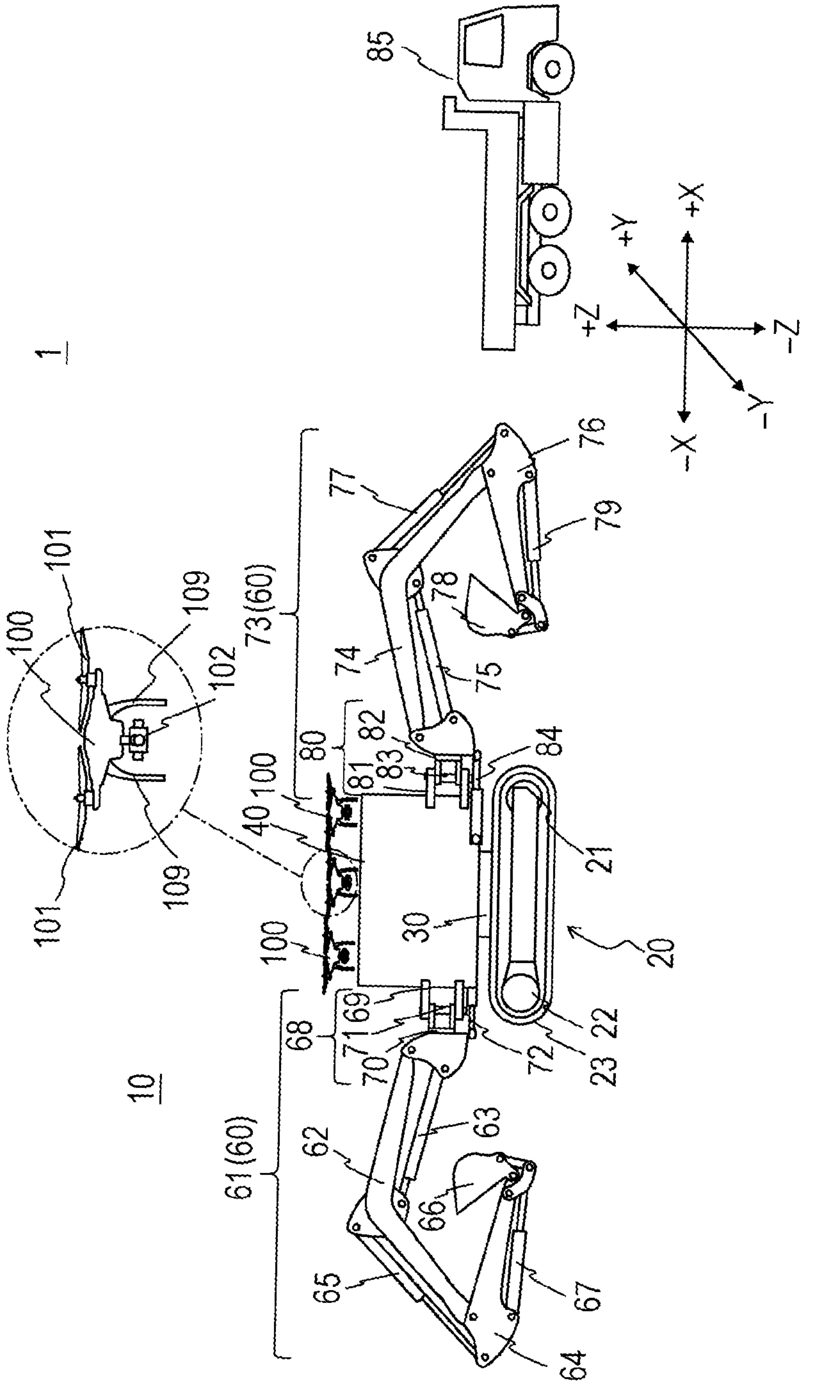
FIG. 1 is a schematic view of a construction machine system representing the present first embodiment.
Figure 2:
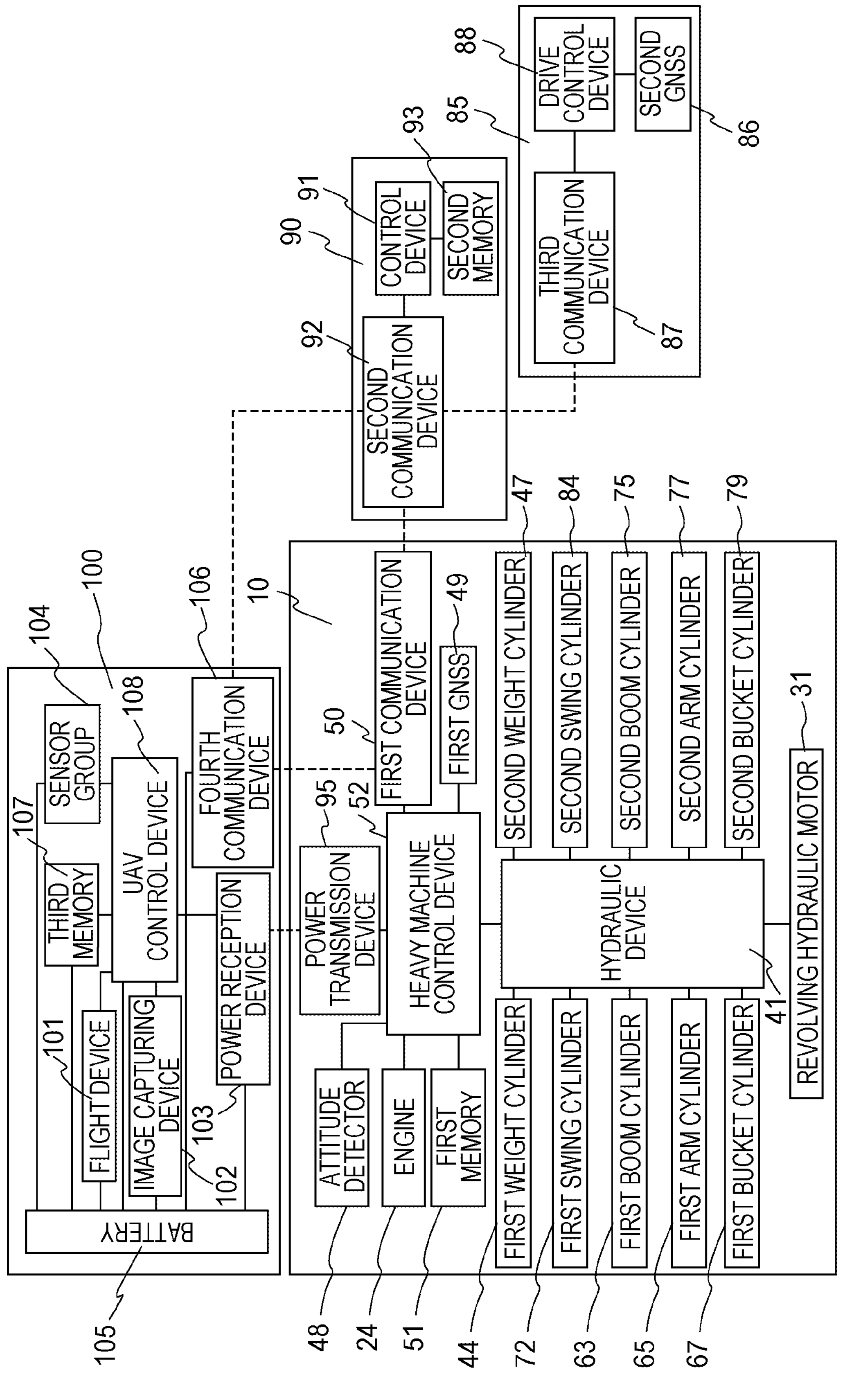
FIG. 2 is a block diagram of the construction machine system of the present first embodiment.

FIG. 1 is a schematic view illustrating the construction machine system 1 representing the present embodiment. FIG. 2 is a block diagram of the construction machine system 1 of the present embodiment. Hereinafter, a configuration of the construction machine system 1 will be described with reference to FIGS. 1 and 2. The construction machine system 1 of the present embodiment includes the hydraulic excavator 10, a dump truck 85, and a central control device 90. Note that, to simplify the block diagram, FIG. 2 illustrates only a block diagram of one drone 100.

Furthermore, as is clear from FIG. 1, the hydraulic excavator 10 of the present embodiment is an automatic operation type without a driver's seat, and includes a plurality of working devices 60 to be described later and a plurality of unmanned aerial vehicles (UAVs, hereinafter referred to as the drones 100). Note that the hydraulic excavator 10 may be traveled by automatic operation at a construction site and may be loaded on a trailer for transportation on a public road. Furthermore, operation of the hydraulic excavator 10 may be automatic operation or a remote operation at a remote place away from an excavation place.

Hydraulic Excavator 10

The hydraulic excavator 10 of the present embodiment includes a traveling device 20, a revolving device 30, a main body device 40, and the working devices 60. Furthermore, the hydraulic excavator 10 includes the plurality of drones 100 that can take off and land at a take-off and landing portion provided on an upper surface of the main body device 40.

The traveling device 20 includes a pair of crawler belts 23 wound around idler wheels 21 and drive wheels 22, and the pair of crawler belts 23 is driven by the drive wheels 22 to cause the hydraulic excavator 10 to travel. Note that an engine 24 of an internal combustion engine constituting the traveling device 20 can be disposed in the main body device 40. Furthermore, the traveling device 20 may be driven by a battery and a motor instead of the engine 24 of the internal combustion engine, or may be a hybrid type in which the engine 24 of the internal combustion engine and a motor are combined. Note that the traveling device 20 may be a tire type wheel system.

The revolving device 30 is disposed between the traveling device 20 and the main body device 40. The revolving device 30 includes a bearing (not illustrated) and a revolving hydraulic motor 31, and revolves the main body device 40 and the working device 60.

FIG. 3A is a cross-sectional view of the main body device 40 of the present first embodiment, and FIG. 3B is a view taken along a line A-A of FIG. 3A. FIGS. 3A and 3B illustrate a first mass body 42, a first guide shaft 43, a first weight cylinder 44, a second mass body 45, a second guide shaft 46, a second weight cylinder 47, and an attitude detector 48.

The main body device 40 has the upper surface having a flat shape and side surfaces connected to the working devices 60. Inside the main body device 40, the engine 24 described above, a hydraulic device 41, the first mass body 42, the first guide shaft 43 that guides the first mass body 42, the first weight cylinder 44 that moves the first mass body 42 along the first guide shaft 43, the second mass body 45, the second guide shaft 46 that guides the second mass body 45, the second weight cylinder 47 that moves the second mass body 45 along the second guide shaft 46, and the attitude detector 48 are provided. The hydraulic device 41 includes a hydraulic pump connected to the engine 24, a hydraulic control valve, and the like, and drives a plurality of cylinders as actuators provided in the working devices Some of the plurality of cylinders include the first weight cylinder 44 and the second weight cylinder 47.

The first mass body 42 and the second mass body 45 correct an unbalanced load acting on the hydraulic excavator 10 by driving the working devices 60, and function as counter masses. In a case where a first bucket 66 to be described later performs excavation, an unbalanced load in a −X direction acts on the hydraulic excavator 10. Thus, by moving the first mass body 42 in a +X direction, the unbalanced load acting on the hydraulic excavator can be corrected.

Furthermore, in a case where the first bucket 66 that has performed excavation revolves along a clockwise direction by the revolving device 30, an unbalanced load in a +Y direction acts on the hydraulic excavator 10. Thus, by moving the first mass body 42 in a −Y direction, the unbalanced load acting on the hydraulic excavator 10 can be corrected.

As compared with a case where the first mass body 42 and the second mass body are not driven, weights of the first mass body 42 and the second mass body 45 can be reduced by driving the first mass body 42 and the second mass body 45.

The first guide shaft 43 is provided along an X direction, and guides movement of the first mass body 42. As the first weight cylinder 44, a hydraulic cylinder is used in the present embodiment, and the first weight cylinder 44 moves the first mass body 42 by hydraulic pressure.

The second guide shaft 46 is provided along a Y direction, and guides movement of the second mass body 45. As the second weight cylinder 47, a hydraulic cylinder is used in the present embodiment, and the second weight cylinder 47 moves the second mass body 45 by hydraulic pressure.

Note that the movement of the first mass body 42 and the second mass body 45 may be performed by linear motors instead of the hydraulic cylinders. In this case, when moving magnet type linear motors in which stators are coils and magnets are provided on sides of the first mass body 42 and the second mass body 45 are used, the unbalanced load acting on the hydraulic excavator 10 can be corrected by also using weights of the magnets.

As the first mass body 42 and the second mass body 45, a metal block may be used, the engine 24 may be used, or the battery described above may be used. By diverting parts such as the engine 24 and the battery, the number of parts can be reduced.

Note that a configuration in which one of the first mass body 42 and the second mass body 45 is omitted may be adopted.

The attitude detector 48 is a sensor that is attached to the main body device 40 and detects an attitude of the main body device 40. As the attitude detector 48, an inclinometer, a level, or the like can be used. The movement of the first mass body 42 and the second mass body 45 can be performed according to the attitude of the main body device 40 detected by the attitude detector 48. Note that the attitude detector 48 illustrated in FIG. 3 is provided in a lower periphery of the main body device 40. This is because a mechanical part and an electronic part for transmitting output of the engine 24 to the traveling device 20 are provided in a lower central portion of the main body device 40.

Furthermore, in the present embodiment, the main body device 40 includes a first global navigation satellite system (GNSS) 49 that is a global positioning system, a first communication device 50, a first memory 51, and a heavy machine control device 52 that controls the entire hydraulic excavator 10. The first GNSS 49 measures a position of the hydraulic excavator 10 by using an artificial satellite.

The first communication device 50 is a wireless communication unit that accesses the central control device 90 or a wide area network such as the Internet. In the present embodiment, the first communication device 50 transmits the position of the hydraulic excavator 10 detected by the first GNSS 49 to the central control device 90 via a second communication device 92, and receives data related to automatic operation of the main body device 40 from the central control device 90 via the second communication device 92.

The first memory 51 is a nonvolatile memory (for example, a flash memory), and stores various types of data and programs for driving the hydraulic excavator 10 and various types of data and programs for automatically operating the hydraulic excavator 10. Furthermore, the first memory 51 stores data related to flight paths of the plurality of drones 100. Note that the data related to the flight paths of the plurality of drones 100 may be stored in a second memory 93 of the central control device 90 to be described later.

The heavy machine control device 52 is a control device that includes a CPU and controls the entire hydraulic excavator 10. The control of the hydraulic excavator 10 by the heavy machine control device 52 will be described later with reference to FIG. 6.

The working devices 60 include a first working device 61 and a second working device 73. As illustrated in FIG. 1, the first working device 61 and the second working device 73 are provided to be shifted by 180 degrees along the X direction, but may be provided to be shifted by 90 degrees. Furthermore, the number of the working devices 60 is not limited to two, and may be three or more.

Because the first working device 61 and the second working device 73 have the same configuration in the present embodiment, the description will be continued for the configuration of the first working device 61. The first working device 61 includes a first boom 62, a first boom cylinder 63, a first arm 64, a first arm cylinder 65, the first bucket 66, a first bucket cylinder 67, and a first swing unit 68.

The first boom 62 is a rotary L-shaped part connected to the main body device 40 via the first swing unit 68, and is rotated by the first boom cylinder 63.

The first arm 64 is connected to a distal end of the first boom 62, and is rotated by the first arm cylinder 65.

The first bucket 66 is connected to a distal end of the first arm 64, and is rotated by the first bucket cylinder 67. Note that, instead of the first bucket 66, a breaker can be attached to the distal end of the first arm 64.

In the present embodiment, the first boom cylinder 63, the first arm cylinder 65, and the first bucket cylinder 67 are hydraulic cylinders, and extend and contract by hydraulic pressure. Furthermore, the extending and contracting operation of the first boom cylinder 63, the first arm cylinder 65 and the first bucket cylinder 67 is performed by the hydraulic device 41.

Figure 4A:
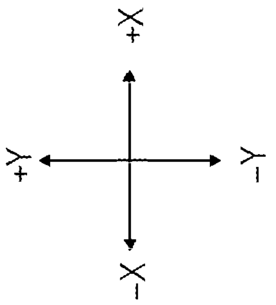
FIG. 4A is a schematic view of a hydraulic excavator as viewed from above when a first swing cylinder and a second swing cylinder are at initial positions.
Figure 4A:
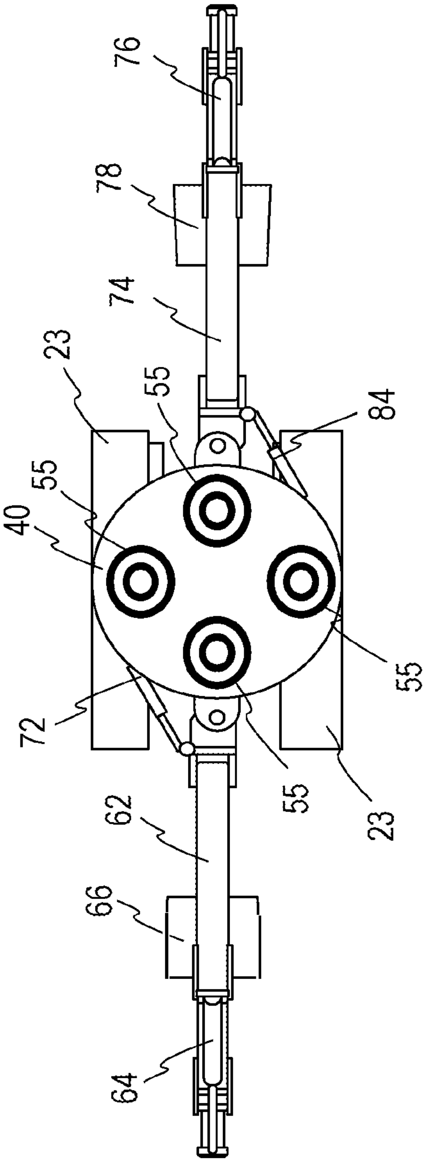
Figure 4B:
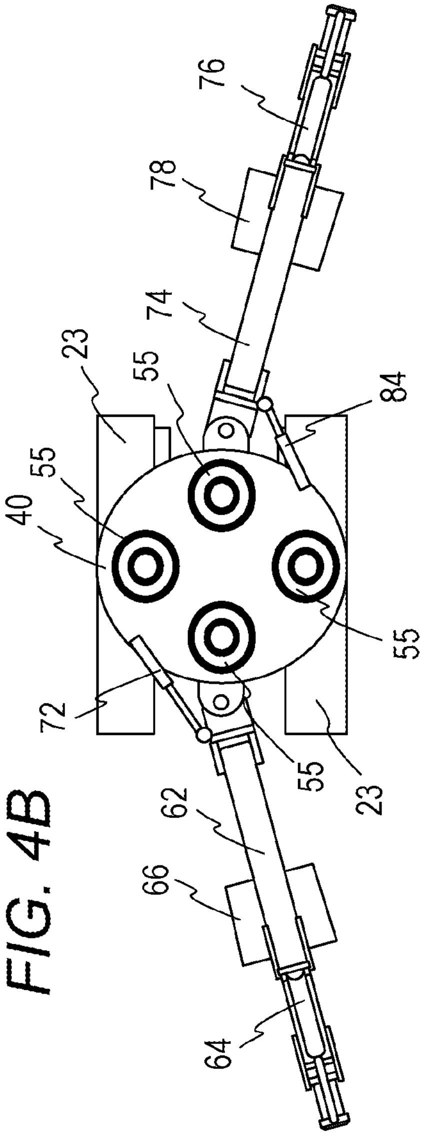
FIG. 4B illustrates a state of the hydraulic excavator where a first working device is driven counterclockwise by the first swing cylinder and a second working device is driven clockwise by the second swing cylinder.

FIGS. 4A and 4B are schematic views of the hydraulic excavator 10 as viewed from above, in which FIG. 4A is a schematic view when a first swing cylinder 72 and a second swing cylinder 84 are at initial positions, and FIG. 4B illustrates a state where the first working device 61 is driven counterclockwise by the first swing cylinder 72 and the second working device 73 is driven clockwise by the second swing cylinder 84.

In the first swing unit 68, first main body side members 69 and first boom side members 70 are pivotally supported by a first shaft support member 71, and the first swing unit 68 rotates the first working device 61 around a Z axis by the first swing cylinder 72 connected to the first boom 62. In the present embodiment, an angle at which the first swing unit 68 rotates the first working device 61 is about 5 degrees to 15 degrees. Furthermore, the first swing cylinder 72 is a hydraulic cylinder, and extending and contracting operation thereof is performed by the hydraulic device 41.

Note that, as illustrated in FIGS. 4A and 4B, a plurality of visual recognition marks 55 visually recognizable from the sky is provided on the upper surface of the main body device 40. The visual recognition marks 55 are used to recognize a landing position by visually recognizing one of the visual recognition marks 55 by an image capturing device 102 to be described later when the drone 100 lands on the take-off and landing portion. Note that a size of the plurality of visual recognition marks 55 is smaller than a size of the drone 100, and in a case where a first drone 100 lands on a first visual recognition mark 55, the first visual recognition mark 55 is not visually recognizable from another drone 100. Furthermore, an interval between the plurality of visual recognition marks 55 is such that the drones 100 do not interfere with each other when the plurality of drones 100 lands on the take-off and landing portion. Note that a shape of the visual recognition mark 55 is not limited to a circular shape, and may be a rectangular shape, an elliptical shape, or a triangular shape, and may be a double mark or a single mark.

A power transmission device 95 supplies power to a power reception device 103 to be described later on a side of the drone 100, and adopts wireless power supply in the present embodiment. The wireless power supply (or wireless power supply unit) supplies power to the power reception device 103 in a non-contact manner, and a magnetic field resonance system, an electromagnetic induction system, and the like are known. The power transmission device 95 of the present embodiment includes a power supply, a control circuit, and a power transmission coil. The power transmission coil is preferably provided in the take-off and landing portion.

Note that a contact-type power supply system may be adopted instead of the wireless power supply. In this case, a metal contact may be provided on each of the power transmission device 95 and the power reception device 103, and the contacts may be mechanically connected to each other for power supply. For example, a contact having a recess shape may be provided on the take-off and landing portion, and a contact having a projection shape may be provided on the side of the drone 100. One contact having the recess shape and one contact having the projection shape may be provided, or a plurality of the contacts having the recess shape and a plurality of the contacts having the projection shape may be provided.

In a case where the hydraulic excavator 10 moves in a construction site with unevenness in a state where the drone 100 lands on the take-off and landing portion, it is desirable to mechanically engage or electromagnetically connect the drone 100 and the take-off and landing portion so that the drone 100 does not move away from the take-off and landing portion. In the present embodiment, a lock mechanism that applies a mechanical lock when the drone 100 lands on the take-off and landing portion is adopted.

The drone 100 of the present embodiment includes flight devices 101, the image capturing device 102, the power reception device 103, a sensor group 104, a battery 105, a fourth communication device 106, a third memory 107, and a UAV control device 108.

The flight device 101 includes a motor (not illustrated) and a plurality of propellers, and floats the drone 100 in the air and generates thrust to move the drone 100 in the air. Note that the number of drones landing on the take-off and landing portion is four in FIG. 4, but can be optionally set, and is not limited to four. Furthermore, the configuration of each drone 100 may be the same, or a part thereof may be changed. Moreover, the sizes of the respective drones 100 may be the same or different.

The image capturing device 102 is a digital camera that includes a lens, an imaging element, an image processing engine, and the like, and captures a moving image and a still image. In the present embodiment, the image capturing device 102 performs surveying and captures an image of an excavated portion. Furthermore, the image capturing device 102 is used to recognize a landing position by visually recognizing one of the visual recognition marks 55 when the drone 100 lands on the take-off and landing portion. Note that, when the power transmission coil or the contact of the power transmission device 95 (e.g., a part of the power supply unit) is provided in the visual recognition mark 55, the battery 105 can be charged via the power reception device 103 promptly after the drone 100 lands on the take-off and landing portion.

In an enlarged view surrounded by an alternate long and short dash line in FIG. 1, the lens of the image capturing device 102 is attached to a side surface (front surface) of the drone 100, but the lens of the image capturing device 102 may be attached to a lower surface of the drone 100, or a plurality of lenses may be provided in the drone 100. Furthermore, a moving mechanism that moves the lens attached to the side surface toward the lower surface may be provided. Furthermore, a mechanism that rotates the image capturing device 102 around the Z axis may be provided to position the lens of the image capturing device 102 at an optional position around the Z axis. Furthermore, in a case where the four drones 100 land on the take-off and landing portion, when the respective lenses are positioned in the −X direction, the +X direction, the −Y direction, and the +Y direction, images close to images visually recognized by an operator from a driver's seat of a conventional hydraulic excavator can be captured from the plurality of directions.

Note that an omnidirectional camera (360 degree camera) may be used as the image capturing device 102, or a three-dimensional scanner may be used instead of the image capturing device 102.

The power reception device 103 includes power reception coils, charging circuits, and the like provided in leg portions 109 of the drone 100, and charges the battery 105 with power from the power transmission device 95.

The battery 105 is a secondary battery connected to the power reception device 103, and a lithium ion secondary battery, a lithium polymer secondary battery, or the like can be used as the battery 105, but the battery 105 is not limited thereto. The battery 105 can supply power (e.g., electric energy) to the flight devices 101, the image capturing device 102, the fourth communication device 106, the third memory 107, and the UAV control device 108.

The sensor group 104 is a GNSS, an infrared sensor for avoiding collision between the drone 100 and another device (for example, the working device 60), a gyro sensor that detects an attitude of the drone 100, an acceleration sensor that detects acceleration acting on the drone 100, and the like.

The fourth communication device 106 includes a wireless communication unit, and communicates with the first communication device 50 and the second communication device 92. In the present embodiment, the fourth communication device 106 transmits image data captured by the image capturing device 102 and a detection result detected by the sensor group 104 to the second communication device 92, and transmits a flight command from the second communication device 92 to the UAV control device 108.

The third memory 107 is a nonvolatile memory (for example, a flash memory), and stores various types of data and programs for flying the drone 100, and stores image data captured by the image capturing device 102, a detection result detected by the sensor group 104, and the like.

The UAV control device 108 includes a CPU, an attitude control circuit, a flight control circuit, and the like, and controls the entire drone 100. Furthermore, the UAV control device 108 determines timing of charging from a remaining amount of the battery 105, and controls an image capturing position, an angle of view, a frame rate, and the like of the image capturing device 102.

Dump Truck 85

Although a well-known dump truck can be used as the dump truck 85, the dump truck 85 includes a second GNSS 86, a third communication device 87, and a drive control device 88 that controls the entire dump truck 85 because automatic operation is performed under the control of the central control device 90 in the present embodiment. The second GNSS 86 measures a position of the dump truck 85. Note that the dump truck 85 may be traveled by automatic operation at a construction site and may be traveled by operation by a person on a public road.

The third communication device 87 communicates the position of the dump truck 85 detected by the second GNSS 86 to the central control device 90 via the second communication device 92. Furthermore, the third communication device 87 receives data related to automatic operation from the central control device 90. Note that a wireless communication unit may be used as the third communication device 87.

Central Control Device 90

The central control device 90 is a control device that controls the entire construction machine system 1. The central control device 90 includes a control device 91, the second communication device 92, and the second memory 93. The control device 91 includes a CPU and controls the hydraulic excavator 10 and the dump truck 85. The second communication device 92 is a wireless communication unit, and communicates with the first communication device 50 and the third communication device 87. Note that the second communication device 92 can also access a wide area network such as the Internet. The second memory 93 is a nonvolatile memory (for example, a flash memory), and stores various types of data and programs for controlling the hydraulic excavator 10 including the plurality of drones 100 and the dump truck 85.

Description of Flowchart

Figure 5:
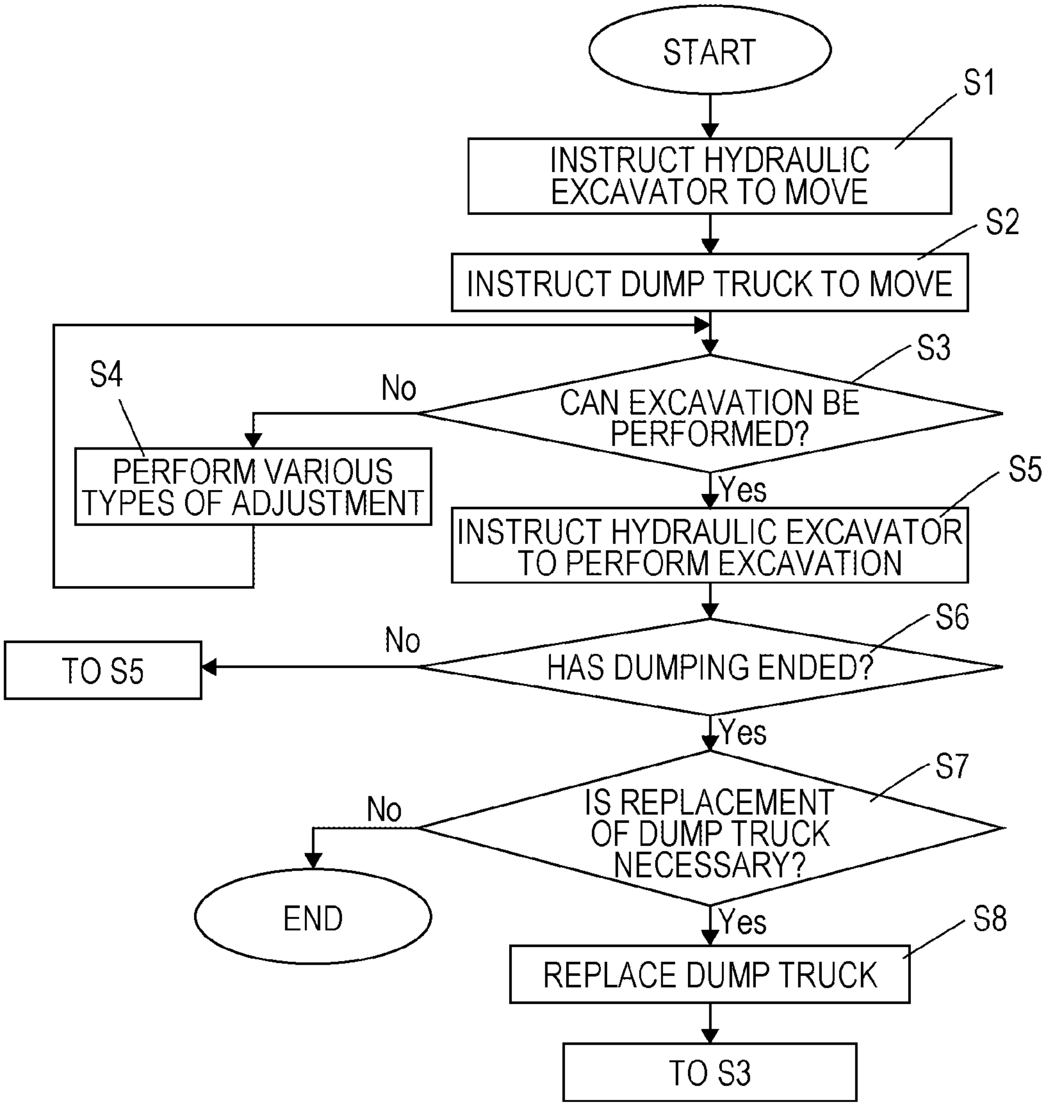
FIG. 5 is a flowchart executed by a central control device of the present first embodiment.
Figure 6:
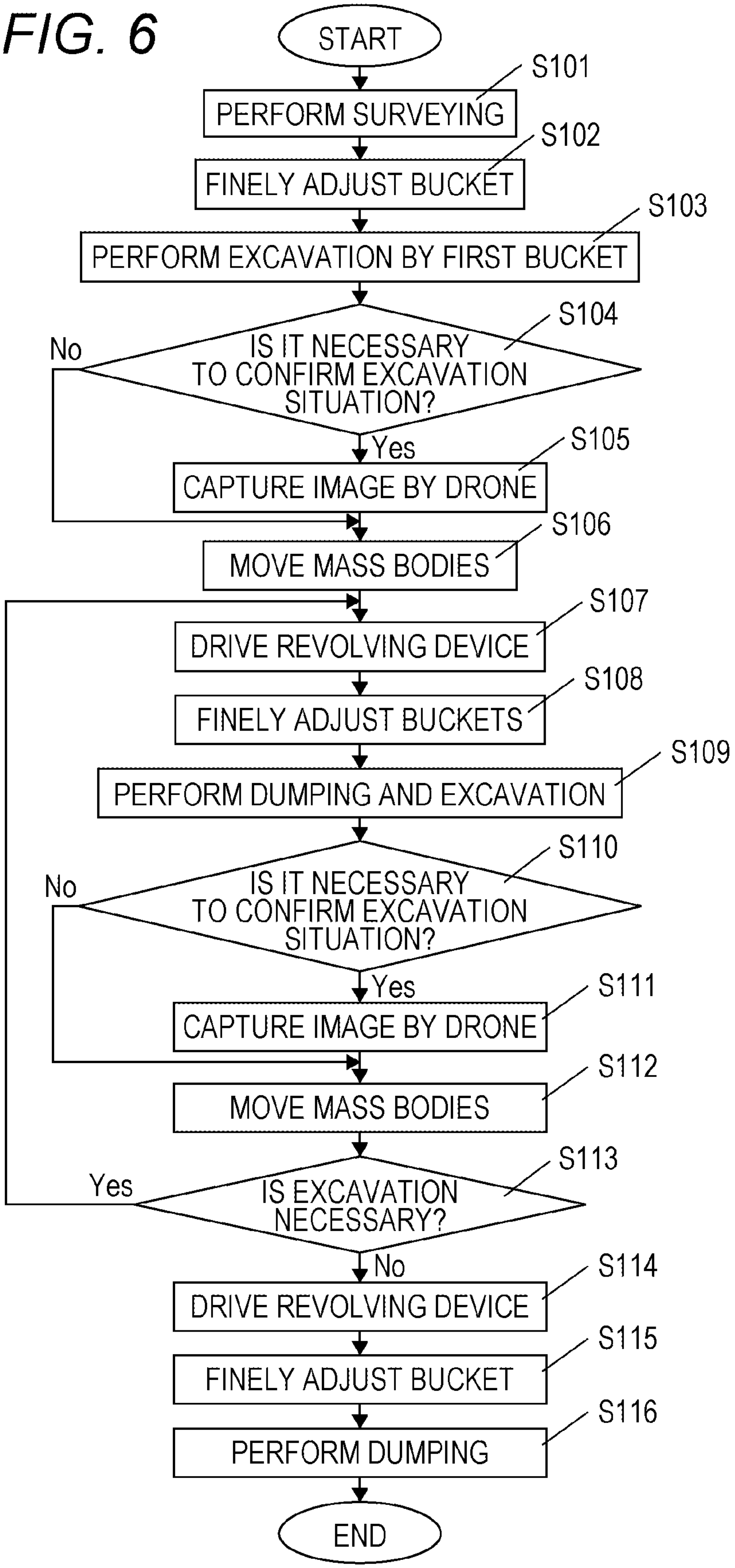
FIG. 6 is a flowchart related to excavation executed by a heavy machine control device of the present first embodiment.

FIG. 5 is a flowchart executed by the central control device 90 of the present embodiment, and FIG. 6 is a flowchart related to excavation executed by the heavy machine control device 52 of the present first embodiment. Hereinafter, the description will be continued for the flowcharts of FIGS. 5 and 6 in sequence.

The central control device 90 instructs the hydraulic excavator 10 at a construction site to move to an excavation place (Step S1). The central control device 90 establishes communication between the first communication device 50 and the second communication device 92, and instructs the hydraulic excavator 10 to move toward the excavation place.

The central control device 90 instructs the dump truck 85 at the construction site to move to a dumping place near the excavation place (Step S2). The central control device 90 establishes communication between the second communication device 92 and the third communication device 87, and instructs the dump truck 85 to move toward the dumping place.

The central control device 90 determines whether or not the hydraulic excavator 10 can perform excavation (Step S3). The central control device 90 proceeds to Step S5 when the hydraulic excavator 10 arrives at the excavation place and can perform excavation and the dump truck 85 arrives at the dumping place, and proceeds to Step S4 otherwise. Here, the description will be continued assuming that the central control device 90 proceeds to Step S4. Note that the central control device 90 may determine the process by the hydraulic excavator 10 being near the excavation place without considering the dump truck 85 as the determination in Step S3.

The central control device 90 recognizes that it is necessary to adjust relative positions of the hydraulic excavator 10 and the dump truck 85 by the communication between the first communication device 50 and the second communication device 92 and the communication between the second communication device 92 and the third communication device 87, and issues an instruction to adjust the position of the dump truck 85. Furthermore, the central control device 90 may instruct surveying by the plurality of drones 100 prior to excavation. Note that the surveying instruction may be performed from the central control device 90 or may be performed from the heavy machine control device 52. The central control device 90 performs the various types of adjustment described above, and proceeds to Step S3 again (Step S4).

The central control device 90 determines whether or not the hydraulic excavator 10 can perform excavation (Step S3), and by the communication between the first communication device 50 and the second communication device 92 and the communication between the second communication device 92 and the third communication device 87, assumes that the relative positions of the hydraulic excavator 10 and the dump truck 85 have entered a predetermined range, and proceeds to Step S5. Here, the predetermined range means that a bucket (a second bucket 78 in FIG. 1) positioned near the dump truck 85 is in a range in which dumping can be performed onto a loading platform of the dump truck 85.

The central control device 90 instructs the hydraulic excavator 10 to perform excavation (Step S5). Excavation by the hydraulic excavator 10 will be described later with reference to the flowchart of FIG. 6.

The central control device 90 determines whether or not dumping onto the dump truck 85 by the hydraulic excavator 10 has ended (Step S6). The central control device 90 repeats Steps S5 and S6 until the loading platform of the dump truck 85 is almost full of excavation objects.

When the loading platform of the dump truck 85 is almost full of the excavation objects, the central control device 90 determines whether or not to replace the dump truck 85 (Step S7). The central control device 90 may determine whether or not the loading platform of the dump truck 85 is almost full of the excavation objects by image capturing of the image capturing device 102 of the drone 100. In this case, the drone 100 can recognize the loading platform of the dump truck 85 by the infrared sensor of the sensor group 104, and approach the loading platform of the dump truck 85 while avoiding collision between the dump truck and the drone 100. When work for the day has not been ended, the central control device proceeds to Step S8 because the replacement of the dump truck 85 is necessary, and when the work for the day has been ended, the central control device 90 moves the dump truck 85 from the dumping place because the replacement of the dump truck 85 is unnecessary, and ends this flowchart. Here, the description will be continued assuming that the central control device 90 determines that the replacement of the dump truck 85 is necessary.

In order to replace the dump truck 85, the central control device 90 moves the dump truck 85 at the dumping place from the dumping place, and moves a dump truck 85 having an empty loading platform (not illustrated) to the dumping place. Note that, in order to shorten a replacement time of the dump truck 85, the central control device 90 may cause the dump truck 85 having the empty loading platform (not illustrated) to stand by near the dumping place in advance.

When the replacement of the dump truck 85 is ended, the central control device 90 repeats Steps S3 to S8 in order to perform the next excavation. Then, when a scheduled excavation amount is reached, the central control device 90 determines No in Step S7, and ends this flowchart. Note that the flowchart of FIG. 5 may be performed by the heavy machine control device 52 instead of the central control device 90.

Next, the description will be continued for excavation executed by the heavy machine control device 52 with reference to the flowchart of FIG. 6. Note that the flowchart of FIG. 6 is started when the first communication device 50 receives the excavation instruction from the central control device 90 in Step S5 of the flowchart of FIG. 5, as described above. Note that, in the flowchart of FIG. 6, the four drones 100 will be described as an example. Thus, for convenience, description is given with reference signs such as a drone 100*a*, a drone 100*b*, a drone 100*c*, and a drone 100*d*.

Prior to starting excavation, the heavy machine control device 52 performs surveying by the image capturing devices 102 of the drone 100*a* and the drone 100*b* (Step S101). Note that, at the time of surveying, the lenses of the image capturing devices 102 face the lower surface (−Z direction).

Figure 7:
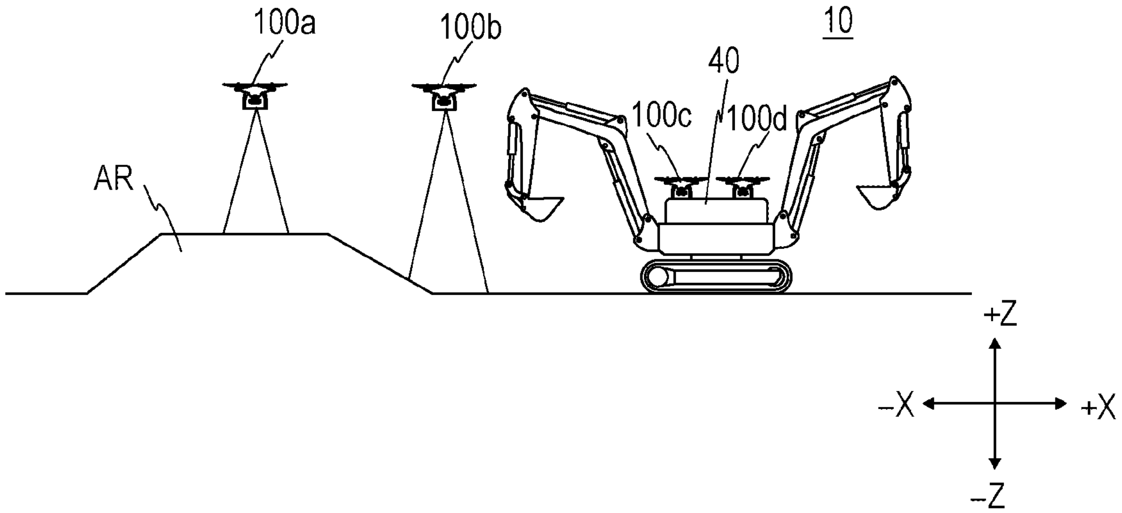
FIG. 7 is a schematic view illustrating a state where two unmanned flying objects (e.g., drones) perform surveying at a construction site and two drones perform charging at a take-off and landing portion provided on the main body device of the hydraulic excavator.
Figure 8:
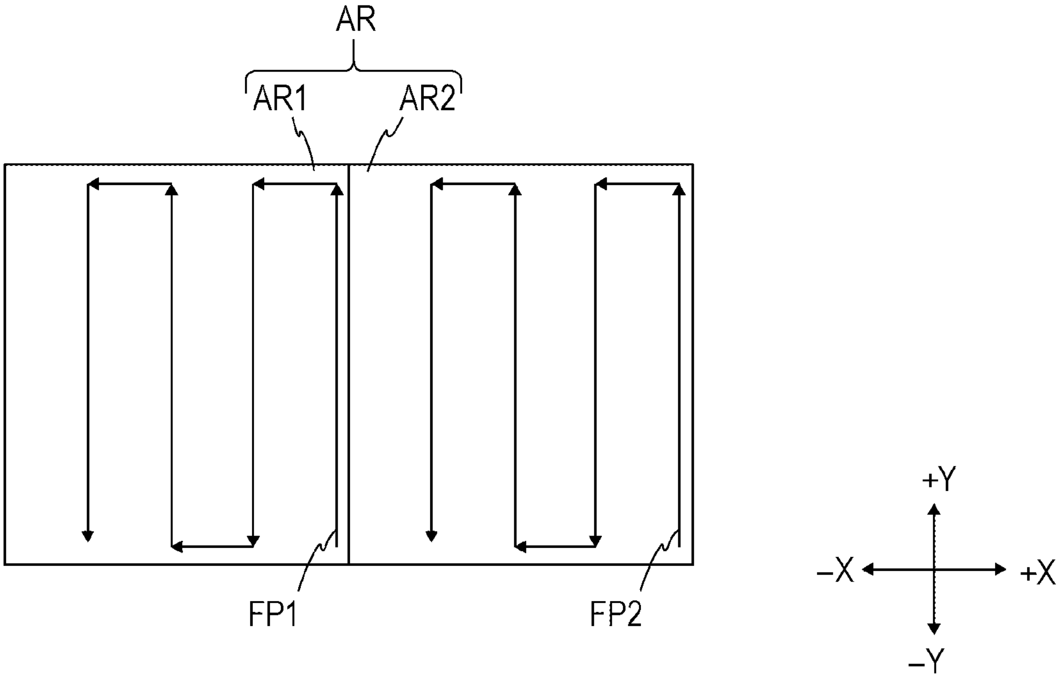
FIG. 8 is a schematic view illustrating a state where a survey area AR is divided into two areas AR1 and AR2.

FIG. 7 is a schematic view illustrating a state where, at the construction site, the drone 100*a* and the drone 100*b* perform surveying in a survey area AR, and the drone 100*c* and the drone 100*d* perform charging at the take-off and landing portion provided on the main body device 40 of the hydraulic excavator 10. Furthermore, FIG. 8 is a schematic view illustrating a state where the survey area AR is divided into two areas AR1 and AR2.

The heavy machine control device 52 transmits a flight path FP1 in the area AR1 stored in the first memory 51 to the drone 100*a*, and transmits a flight path FP2 in the area AR2 stored in the first memory 51 to the drone 100*b*. Arrows in FIG. 8 indicate the flight path FP1 in the area AR1 and the flight path FP2 in the area AR2. The flight path FP1 and the flight path FP2 are set such that drone 100*a* and drone 100*b* maintain a predetermined distance. This prevents the drone 100*a* and the drone 100*b* from coming into contact with each other or colliding with each other.

Figure 9:
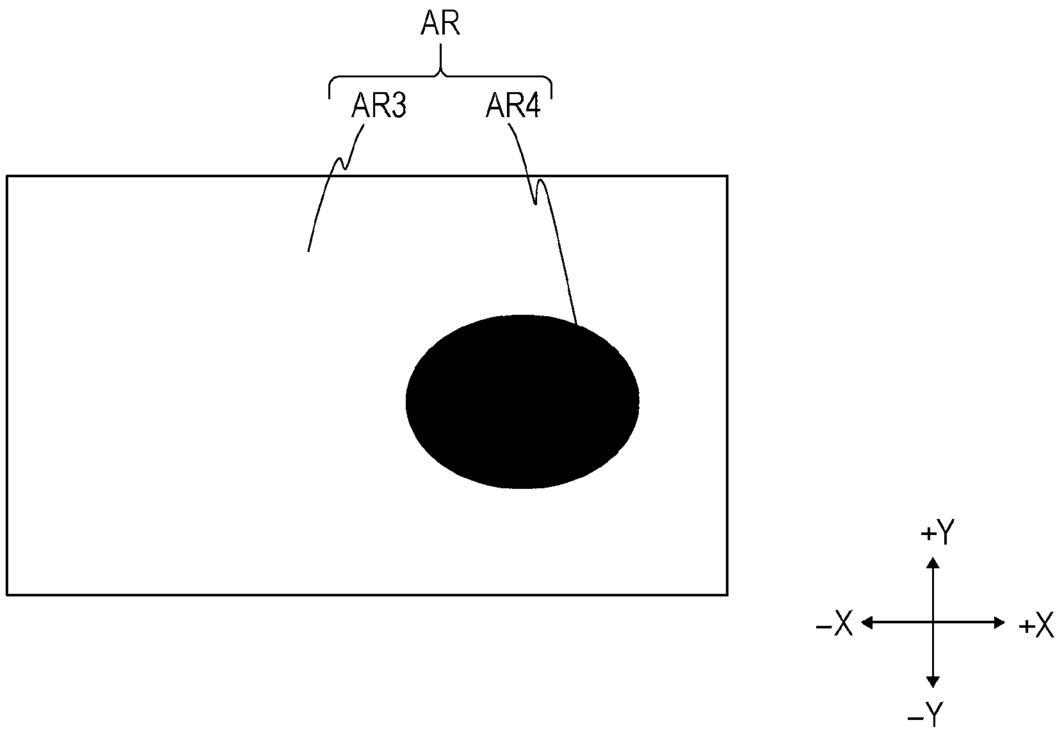
FIG. 9 is a schematic view illustrating a state where the survey area AR is divided into another two areas AR3 and AR4.

FIG. 9 is a schematic view illustrating a state where the survey area AR is divided into another two areas AR3 and AR4. The area AR3 is a non-forest area similar to the areas AR1 and AR2, and the area AR4 is a forest area with a forest. In the present embodiment, surveying by the image capturing device 102 is performed in the area AR3, and surveying by a three-dimensional scanner using a laser is performed in the area AR4. In this case, it is sufficient that the drone 100*b* is equipped with the three-dimensional scanner instead of the image capturing device 102 or in addition to the image capturing device 102. This enables accurate surveying even in a case where a forest area is included in the survey area AR.

In the present embodiment, because surveying is performed by the plurality of drones 100, a surveying time can be shortened as compared with surveying by one drone. Note that the survey area AR is not limited to be divided into two, and may be divided into three or more, and in this case, it is sufficient that three or more drones 100 are used. When the surveying is ended, the drone 100*a* and the drone 100*b* land on the take-off and landing portion provided on the main body device 40 of the hydraulic excavator 10, and start charging. On the other hand, the drone 100*c* takes off from the take-off and landing portion, and performs image capturing by the image capturing device 102 from above the hydraulic excavator 10.

When the surveying is ended, the heavy machine control device 52 drives the first swing cylinder 72 to finely adjust a position of the first bucket 66 (Step S102). Note that Step S102 may be omitted when the fine adjustment of the position of the first bucket 66 is not necessary prior to the start of the excavation.

Next, the heavy machine control device 52 performs excavation by the first bucket 66 (Step S103). The heavy machine control device 52 drives and controls the first boom cylinder 63, the first arm cylinder 65, and the first bucket cylinder 67 by the hydraulic device 41, to perform the excavation by the first bucket 66.

In parallel with the excavation in Step S103, the heavy machine control device 52 determines whether or not it is necessary to confirm an excavation situation on the basis of image data from the image capturing device 102 of the drone 100*c* (Step S104). Here, it is assumed that the heavy machine control device 52 proceeds to Step S105 assuming that it is necessary to confirm the state of the first bucket 66. Note that it may be determined whether or not it is necessary to confirm the excavation situation on the basis of image data from the image capturing device 102 of at least one of the drone 100*a* and the drone 100*b* landing on the take-off and landing portion, instead of or in combination with the image capturing device 102 of the drone 100*c*. An image captured by the image capturing device 102 of the drone 100*a* landing on the take-off and landing portion corresponds to an image visually recognized by an operator from a driver's seat of a conventional hydraulic excavator. Thus, by using the image captured by the image capturing device 102 of the drone 100*a* landing on the take-off and landing portion, it is possible to determine whether or not it is necessary to confirm the excavation situation with a sense of visual recognition from the conventional driver's seat.

Figure 10:
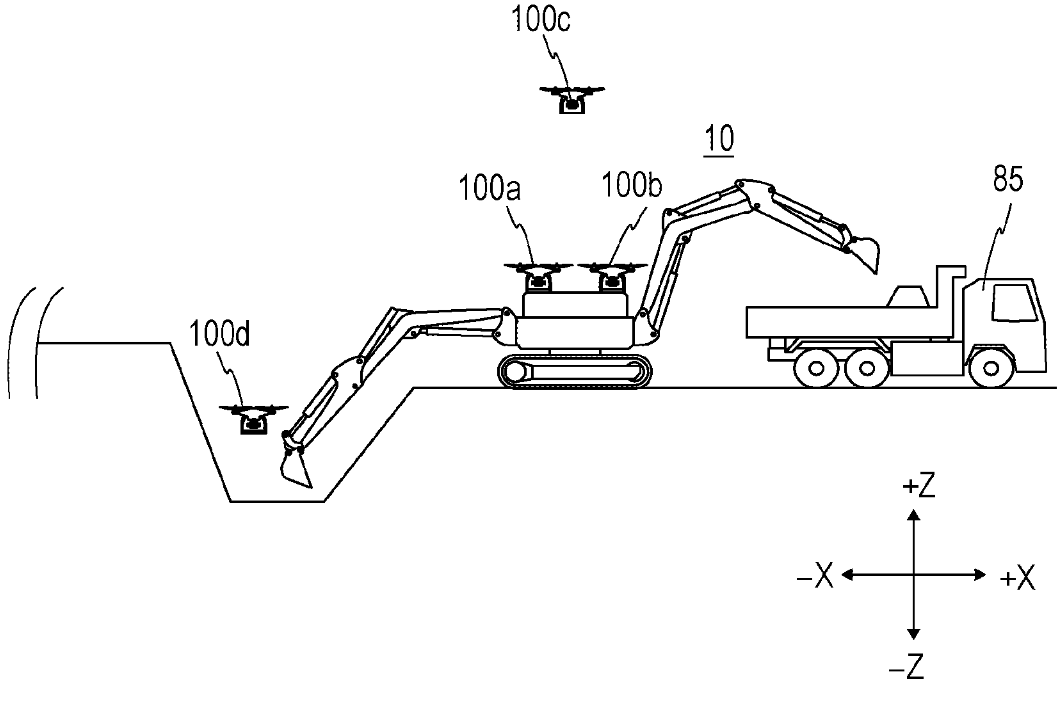
FIG. 10 is a view illustrating a state where the drone is capturing an image of a first bucket performing excavation.

The heavy machine control device 52 instructs the drone 100*d* to capture an image of the first bucket 66 (Step S105). The UAV control device 108 moves the drone 100*d* closer to the first bucket 66 by the flight devices 101, and instructs image capturing by the image capturing device 102. FIG. 10 is a view illustrating a state where the drone 100*d* is capturing an image of the first bucket 66 performing excavation.

The UAV control device 108 can recognize the first bucket 66 by the infrared sensor of the sensor group 104, and can move the drone 100*d* closer to the first bucket 66 while avoiding collision between the first bucket 66 and the drone 100*d*. Note that the heavy machine control device 52 may stop movement of at least one of the hydraulic excavator 10 and the dump truck 85 when the hydraulic excavator 10 and the dump truck 85 approach each other to a predetermined distance (for example, several tens of cm to 1 m) on the basis of the image capturing of the image capturing device 102 of the drone 100*c*. This can prevent the hydraulic excavator 10 and the dump truck 85 from coming into contact with each other or colliding with each other.

In the present embodiment, the heavy machine control device 52 uses the image capturing device 102 of the drone 100*c* to capture an image of the construction site from above the hydraulic excavator 10 at the time of excavation, and when more detailed image capturing is required, the drone 100*d* flies to an object area (for example, the first bucket 66) to perform image capturing using the image capturing device 102 of the drone 100*d*. Thus, the heavy machine control device 52 can acquire an image of the detailed excavation situation. Furthermore, by acquiring the image of the detailed excavation situation by the central control device 90 via the first communication device 50 and the second communication device 92, it is possible to acquire the detailed excavation situation almost in real time even in a case where the central control device 90 is installed in a remote place. Note that the image capturing by the image capturing device 102 of the drone 100*d* is performed at a position lower in altitude than the image capturing by the image capturing device 102 of the drone 100*c* (e.g., under different image capturing conditions). For example, the image capturing of the drone 100*c* is performed at about 6 m to 12 m above the ground, whereas the image capturing of the drone 100*d* is performed at 6 m or less above the ground. Furthermore, an image capturing interval of the image capturing device 102 of the drone 100*d* is set to be shorter than an image capturing interval of the image capturing device 102 of the drone 100*c*, so as to acquire more images.

Note that the heavy machine control device 52 may position the drone 100*c* in the −X direction above the hydraulic excavator 10, position the drone 100*d* in the +X direction above the hydraulic excavator 10, and cause the drone 100*c* and the drone 100*d* to capture images of the construction site from above the hydraulic excavator 10. In this case, one of the drone 100*c* and the drone 100*d* may be moved according to a position where detailed image capturing is required. Furthermore, in a case where the remaining amounts of the batteries 105 of the drone 100*c* and the drone 100*d* decrease, it is sufficient that the drone 100*c* and the drone 100*d* are landed on the take-off and landing portion to charge the batteries 105, and the drone 100*a* and the drone 100*b* are taken off to perform image capturing by the respective image capturing devices 102. Note that the image capturing may be performed by using the image capturing device 102 of at least one of the drone 100*c* and the drone 100*d* that have landed on the take-off and landing portion.

In parallel with the excavation control in Step S103, the heavy machine control device 52 performs unbalanced load correction of the hydraulic excavator 10 by movement of the first mass body 42 and the second mass body 45 (Step S106). As described above, when the first bucket 66 performs excavation, the unbalanced load in the −X direction acts on the hydraulic excavator 10. Thus, by moving the first mass body 42 in the +X direction, the heavy machine control device 52 corrects the unbalanced load acting on the hydraulic excavator 10. In this case, the heavy machine control device 52 performs feedforward control to calculate the unbalanced load acting on the hydraulic excavator 10 from driving amounts of the first boom cylinder 63, the first arm cylinder 65, and the first bucket cylinder 67 and move the first mass body 42 and the second mass body 45 together with the start of the excavation in Step S103. Furthermore, the heavy machine control device 52 performs feedback control to control the movement of the first mass body 42 and the second mass body on the basis of a detection result of the attitude detector 48. Note that gravimeters may be provided in the first bucket 66 and the second bucket 78, and a weight of excavation objects may be measured by the gravimeter and used for the feedforward control and the feedback control described above.

Because the heavy machine control device 52 performs the feedforward control to perform the unbalanced load correction almost at the same time as the unbalanced load acts on the hydraulic excavator 10, it is possible to quickly perform the unbalanced load correction acting on the hydraulic excavator 10 before the large unbalanced load acts on the hydraulic excavator 10. Furthermore, because the heavy machine control device 52 performs the feedback control based on the detection result of the attitude detector 48, it is possible to accurately correct the unbalanced load acting on the hydraulic excavator 10. Note that the heavy machine control device 52 may perform the unbalanced load correction by driving the second bucket 78 when the first bucket 66 performs the excavation, or may use the first mass body 42, the second mass body 45, and the second bucket 78 in combination. In this case, it is preferable to perform the feedback control in consideration of the drive of the second bucket 78 when the feedforward control described above is performed.

When the excavation in Step S103 is ended, the heavy machine control device 52 revolves the main body device 40 and the working device 60 180 degrees by the revolving device 30 (Step S107). By the revolving of the main body device 40 and the working device by the revolving device 30, the first bucket 66 is positioned near the dump truck 85 and the second bucket 78 is positioned near the excavation place. Also in this case, in a case where the first bucket 66 revolves along the clockwise direction by the revolving device 30, the unbalanced load in the +Y direction acts on the hydraulic excavator 10. Thus, it is preferable to move the first mass body 42 so as to correct the unbalanced load acting on the hydraulic excavator 10.

When fine adjustment of a bucket position of at least one of the first bucket 66 and the second bucket 78 is necessary, the heavy machine control device 52 drives the first swing cylinder 72 and the second swing cylinder 84 to finely adjust the positions of the first bucket 66 and the second bucket 78 (Step S108). Specifically, the heavy machine control device 52 drives the first swing cylinder 72 so that the first bucket 66 can perform dumping onto the loading platform of the dump truck 85. Furthermore, the heavy machine control device 52 drives the second swing cylinder 84 so that the second bucket 78 is positioned at the excavation place.

The heavy machine control device 52 dumps excavation objects (e.g., excavation material) excavated by the first bucket 66 onto the loading platform of the dump truck 85 that may carry the excavation objects, and performs excavation by the second bucket 78 (Step S109). The heavy machine control device 52 drives and controls the first boom cylinder 63, the first arm cylinder 65, and the first bucket cylinder 67 by the hydraulic device 41 to perform the dumping by the first bucket 66. Furthermore, the heavy machine control device 52 drives and controls a second boom cylinder 75, a second arm cylinder 77, and a second bucket cylinder 79 by the hydraulic device 41 to perform the excavation by the second bucket 78.

In parallel with the excavation in Step S109, the heavy machine control device 52 determines whether or not it is necessary to confirm an excavation situation on the basis of image data from the image capturing device 102 of the drone 100*c* (Step S110). Because the operation of confirming the excavation situation is basically the same as that in Step S104, the heavy machine control device 52 determines No here and proceeds to Step S112.

In parallel with the excavation control in Step S109, the heavy machine control device 52 performs unbalanced load correction of the hydraulic excavator 10 by movement of the first mass body 42 and the second mass body 45 (Step S112). The heavy machine control device 52 preferably uses the feedforward control and the feedback control in combination also for the unbalanced load correction in Step S112.

The heavy machine control device 52 determines whether or not further excavation is necessary (Step S113). The heavy machine control device 52 proceeds to Step S107 when excavation scheduled on the day has not been ended, and proceeds to Step S114 when the excavation scheduled on the day has been ended. Here, it is assumed that the heavy machine control device 52 proceeds to Step S114 assuming that the excavation scheduled on the day has been ended.

The heavy machine control device 52 revolves the main body device 40 and the working device 60 180 degrees by the revolving device 30 (Step S114). In a case where the main body device 40 and the working device 60 are revolved along the clockwise direction in Step S107, the heavy machine control device 52 revolves the main body device 40 and the working device 60 along a counterclockwise direction. Conversely, in a case where the main body device 40 and the working device 60 are revolved along the counterclockwise direction in Step S105, the heavy machine control device 52 revolves the main body device 40 and the working device 60 along the clockwise direction. In this way, it is sufficient to avoid interference of the working device 60 with another device in the revolving range of 180 degrees, and as compared with a case of avoiding interference of the working device 60 with another device in a revolving range of 360 degrees, safety confirmation becomes easier, and the construction site can be used effectively.

Because the heavy machine control device 52 does not perform excavation, the heavy machine control device 52 adjusts the position of the bucket near the dump truck 85 (Step S115). The heavy machine control device 52 drives the second swing cylinder 84 so that the second bucket 78 can perform dumping onto the loading platform of the dump truck 85. Note that Step S115 may be omitted when adjustment of the position of the bucket near the dump truck 85 is unnecessary.

Next, the heavy machine control device 52 dumps excavation objects excavated by the second bucket 78 onto the loading platform of the dump truck 85 (Step S116). Note that, because the excavation by the first bucket 66 is not performed here, a large unbalanced load does not act on the hydraulic excavator 10. Thus, the unbalanced load correction by the first mass body 42 and the second mass body 45 may be performed or may be omitted.

As described above in detail, because the two working devices 60 are provided in the present embodiment, it is possible to perform excavation and dumping almost at the same time, and thus, it is possible to achieve the hydraulic excavator 10 with good workability. Furthermore, because surveying, confirmation of an excavation situation, and the like are performed by the plurality of drones 100 in the present embodiment, a surveying time and a confirmation time of the excavation situation can be shortened. Furthermore, even in a case where the remaining amount of the battery 105 of the flying drone 100 decreases, the drone 100 that is not flying is charging, and thus, it is possible to promptly replace the drone 100 to be flown. Therefore, it is not necessary to substantially consider limitation of a flight time of the drone 100.

Because the take-off and landing portion is provided at a top of the main body device 40 as is clear from FIG. 1, for example, the drones 100 can perform image capturing by the image capturing devices 102 without being blocked by the main body device 40.

Furthermore, according to the present embodiment, because the drones 100 assist the construction machine system 1, automated construction work can be efficiently implemented.

Modification

In the embodiment described above, the case where the hydraulic excavator 10 is applied to excavation has been described, but the application of the hydraulic excavator 10 is not limited thereto. For example, the hydraulic excavator 10 can also be applied to a case where a natural disaster such as a large typhoon causes a river to overflow and an isolated settlement occurs. The heavy machine control device 52 approaches the isolated settlement while removing obstacles by using the working devices 60, and causes the plurality of drones 100 to fly toward the isolated settlement. The fourth communication devices 106 of the plurality of drones 100 may be used as base stations of mobile phones of the isolated settlement. In this case, it is preferable to arrange the plurality of drones 100 at almost equal intervals, and to land the plurality of drones 100 on a building such as a school or a hotel so as not to fly in order to suppress consumption of the batteries 105. Furthermore, the batteries 105 of the plurality of drones 100 may be used as power supplies. Furthermore, the plurality of drones 100 may also be used to transport daily necessities such as food, water, batteries, blankets, and medical equipment and supplies such as AEDs and medicines.

The embodiment described above is merely an example for describing the present invention, and various changes can be made without departing from the gist of the present invention. For example, when an infrared camera is used as the image capturing device 102, a series of work such as excavation and dumping can be performed even at night, and a work period can be shortened. Instead of the first bucket, a breaker, a fork, a ripper, or a lifter may be attached to the first arm 64.

The following is a list of reference signs used in the drawing figures and in this specification.

1 Construction machine system
10 Hydraulic excavator
20 Traveling device
30 Revolving device
40 Main body device
41 Hydraulic device
42 First mass body
45 Second mass body
48 Attitude detector
52 Heavy machine control device
60 Working device
61 First Working Device
73 Second working device
85 Dump truck
90 Central control device
95 Power transmission device
100 Drone
102 Image capturing device
103 Power reception device
104 Sensor group
105 Battery
108 UAV control device

The invention claimed is:

1. A construction machine, comprising:

a main body device that travels by a traveling device;

a working device connected to the main body device, wherein the working device rotates to perform work;

a take-off and landing portion provided on the main body device, wherein the take-off and landing portion is arranged so that each of a first unmanned flying object equipped with a first imaging device and a second unmanned flying object equipped with a second imaging device is configured to take off and land at the take-off and landing portion; and a control device that controls the first unmanned flying object to image the working device during flight and that controls the second unmanned flying object to image, during flight, a truck that loads an excavated material from the working device, wherein the control device prevents a collision between the construction machine and the truck based on an imaging result of the second unmanned flying object, and wherein the control device determines whether to move the truck carrying the excavated material based upon the imaging result of the second unmanned flying object.

2. The construction machine according to claim 1, wherein the control device controls the first unmanned flying object and the second unmanned flying object to perform image capturing at different altitudes.

3. The construction machine according to claim 1, wherein the control device controls the first imaging device and the second imaging device to capture images in different directions when the first unmanned flying object and the second unmanned flying object are landing on the take-off and landing portion.

4. The construction machine according to claim 1, wherein the working device performs excavation, and the control device controls the second imaging device to capture an image of the truck that loads the excavated material from the working device.

5. The construction machine according to claim 1, wherein the traveling device comprises a pair of crawlers and the main body device is positioned between the crawlers.

* * * * *